Aug. 18, 1959     F. A. FARINET, JR     2,899,878
PHOTOELECTRIC SENSING UNIT FOR AIRCRAFT GUN CAMERAS
Filed Feb. 20, 1956     3 Sheets-Sheet 1
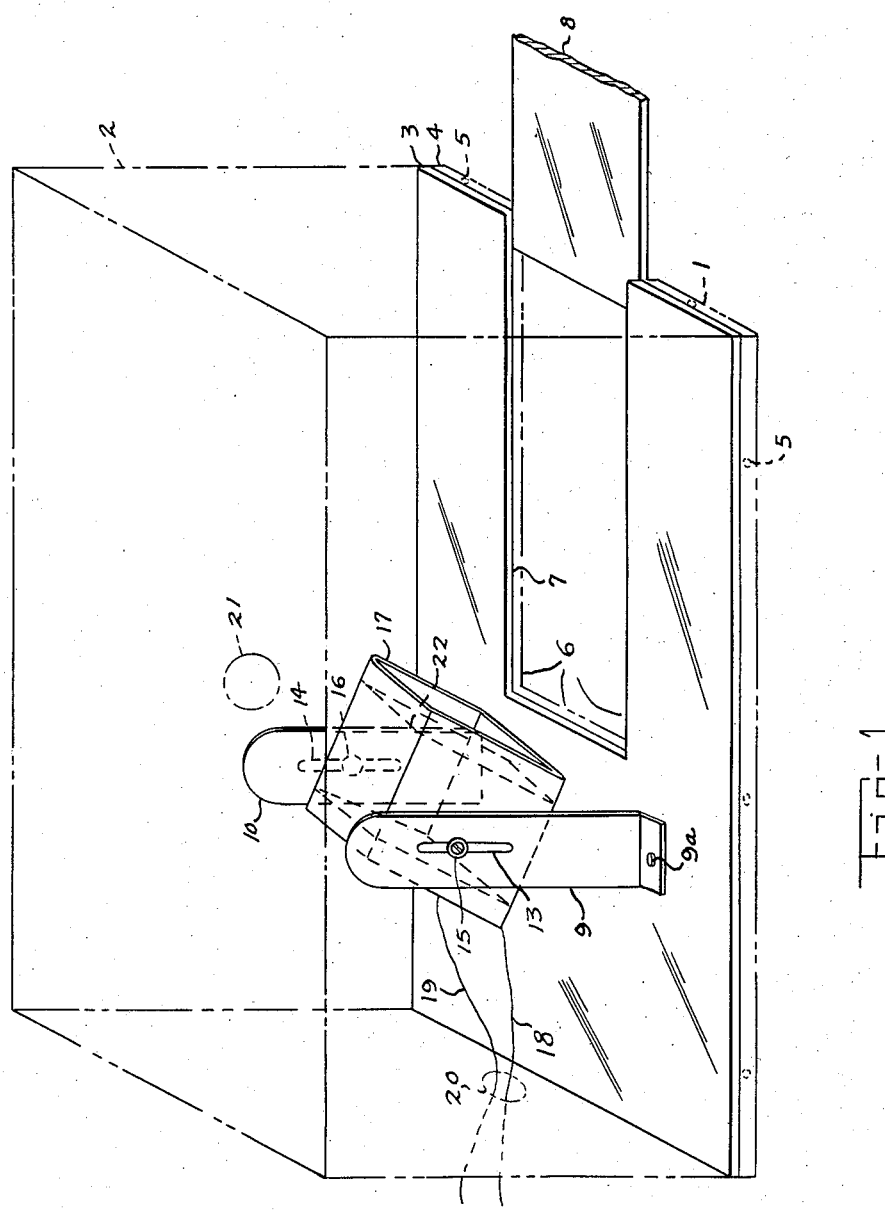
INVENTOR.
FRED A. FARINET JR.
BY
ATTORNEYS Aug. 18, 1959     F. A. FARINET, JR     2,899,878
PHOTOELECTRIC SENSING UNIT FOR AIRCRAFT GUN CAMERAS
Filed Feb. 20, 1956     3 Sheets-Sheet 2

INVENTOR.
FRED A. FARINET JR.

BY
ATTORNEYS

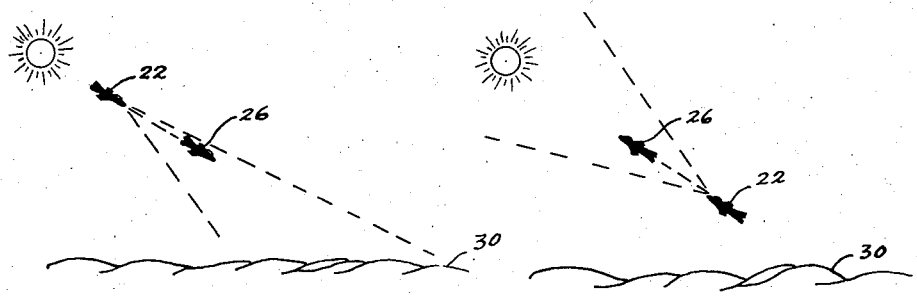
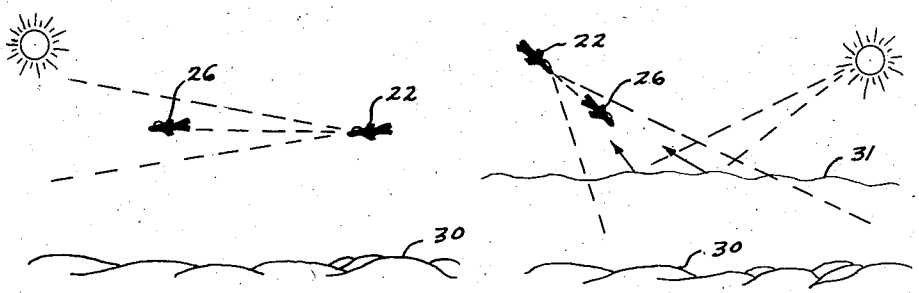

2,899,878
Patented Aug. 18, 1959

2,899,878

PHOTOELECTRIC SENSING UNIT FOR AIRCRAFT GUN CAMERAS

Fred A. Farinet, Jr., Dayton, Ohio, assignor to the United States of America as represented by the Secretary of the Air Force Application February 20, 1956, Serial No. 566,738

4 Claims. (Cl. 95—10)

(Granted under Title 35, U.S. Code (1952), sec. 266)

The invention described herein may be manufactured and used by or for the United States Government for governmental purposes without payment to me of any royalty thereon.

The present invention relates to an improved system and apparatus to accurately sense the light level of a subject to a photographed and by means of the electrical output developed in a sensing system to be capable of operating an automatic servo system for adjustment of the exposure opening or aperture of a conventional aircraft gun camera to correspond with the brightness level of said subject alone, and to eliminate the brightness of the background or area surrounding the subject.

In the art of photography, the utilization of a photoelectric sensing unit or light meter to sense the light level of the subject is well known. The common types now in use, however, are not equipped to operate effectively in air-to-air photography; that is, the photography of airborne subjects from another plane in flight. In the past, the main disadvantage in using former types of sensing units arose from the difficulty of obtaining the true brightness level of the subject to be taken in air-to-air photography because of the background brightness levels. Air-to-air photography differs from normal ground photography in that the subject itself, usually an enemy or target plane, is very small in comparison to the overall scene or area photographed. Therefore, although the primary objective in flight camera operations is to gain a clear and proper exposure of the target aircraft alone, the exposure has been in the past determined by the light level reflected from the overall scene, rather than by the light level reflected by the target aircraft alone and thus often resulting in severe overexposures or underexposures. It is thus an object of the present invention to provide a photocell sensing unit or light meter arrangement which can register a full equivalent of the true brightness level of the subject alone, and will exclude the light level of the overall scene.

It is a further object to provide a photocell sensing unit which is compact and simple in operation and does not require special adjustments for each scene photographed.

A further object is to provide a photoelectric sensing unit which will accurately indicate the true brightness level of the subject to be photographed and will not be responsive to background brightness of the photographed subject and eliminate the necessity of adjustment of the unit by the aircraft operator.

A further object is to provide a photocell or light meter sensing unit which is adaptable for use in air-to-air photography and air-to-ground photography.

A still further object is to provide a photocell sensing unit which can be easily installed on an aircraft and easily maintained.

Other objects and advantages will become apparent from the following description and accompanying drawings in which:

Fig. 2 is a somewhat diagrammatic perspective view of the photoelectric sensing unit mounted upon a camera aircraft;

Figure 1:
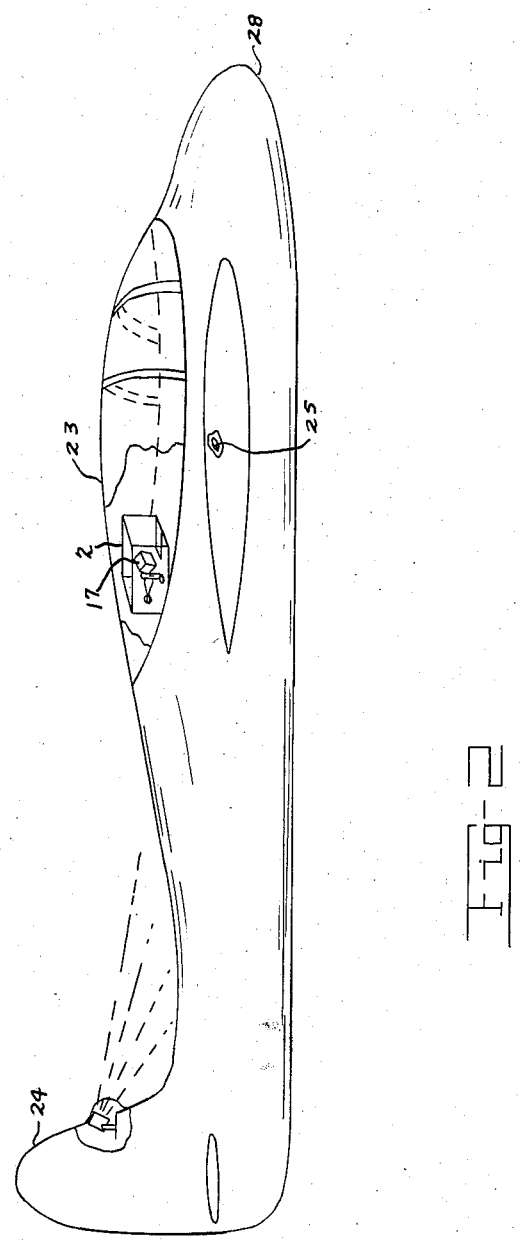
Figure 1 is a perspective view of the photoelectric sensing unit.

Figs. 3, 4, 5, and 6 are somewhat diagrammatic views illustrating the adverse effect of the background brightness relative to the subject photographed on standard sensing units in regulating or determining the true light value for the exposure for the subject to be photographed.

Referring more particularly to the drawing in Figure 1, there is shown the photoelectric sensing unit 1 having the rectangular transparent Plexiglas cover 2 the under side of which is open to provide for fastening of the two aluminum base plates 3 and 4 to the lower edges of the upright side portions of the cover 2 by suitable means such as the screws 5.

The base plate 3, of the same size as the plate 4, is rigidly mounted on plate 4, and is painted black to present a non-reflective surface for the light rays of the sun striking it. Both the plates 3 and 4 are provided with coincident rectangular-shaped openings each extending from the outside forward edge of the plate inwardly at least one-half the lengthwise portion of the plates 3 and 4 to form an opening 6.

The opening 6 is also provided with longitudinal grooves 7 extending along the side edges and across the rearward innermost edge of the opening 6 for insertion of a replaceable aluminum or reflective insert plate 8, the reflective insert plate 8 being replaceable by other plates to provide light reflective properties similar to the surface of the target aircraft or the subject to be photographed. Disposed rearwardly from the innermost end of opening 6 is a pair of upright metallic arms or supports 9 and 10, attached to the base plates 3 and 4 by means of laterally bent feet and suitable fastening 9a. The arms 9 and 10 are further provided with the vertical slots 13 and 14 for rotatable and slidable up-and-down engagement of the supporting screws 15 and 16 within the slots. The supporting screws 15 and 16 are threadably engaged with a metallic frame or hood 17 to rotatably position the hood in a raised or lowered position directly behind and overlooking the insert opening 6. Fixed within the hood 17 so as to be responsive to incident and reflected light rays striking the aluminum insert 8 is a photoelectric cell 22, such as one of the selenium, self-generating barrier layer types. Said hood 17 is normally responsive only to incident light rays when in the raised position and reflected light rays when in the lowered position; however, it is also responsive to incident light rays as well as reflected light rays in the lowered position when in the tracking position shown in Fig. 6 of the drawings to be explained in more detail hereinafter. The lead wires 18 and 19 of the photoelectric cell 22 extend through an opening 20 in the cover 2 and may extend into an automatic exposure control box and circuit such as the system described in my copending application, Serial No. 566,739 filed on Feb. 20, 1956, to conduct the current generated by the cell 22 into the exposure control circuit. An opening 21 is provided in the upright side portion of the Plexiglas cover 2 for introduction of suitable adjustment means, such as a screwdriver, for rotative adjustment of the hood 17 to cause the photocell 22 to face directly forward. Although not pertinent to the inventive aspects of my present invention, rotation of the cell to a forward position can also be easily accomplished by remote means such as a switch providing power to a simple mechanism, for instance, a ratchet type rotary solenoid suitably designed for the purpose, attached to the hood 17.

In mounting, the sensing unit may be conveniently attached to the camera aircraft 28 as shown in Fig. 2, such as behind the pilot's seat and inside the cockpit 23 to provide additional protection for the sensing unit 1. The forward end of the unit 1 is then in a position facing in the direction of flight of the camera aircraft, the base plates 3 and 4 being fixed to the cockpit in a position parallel to the axis of flight of the aircraft. An alternate position for the sensing unit is within the camera aircraft's tail fin 24, mounting the cell high on this fin parallel to the axis of flight and behind a bubble-shaped Plexiglas shell attached to the fin, and within the leading edge of the fin with the cell's angle of mounting chosen so that a large portion of the upper fuselage surface is viewed by the cell at approximately the same viewing angle as the viewing angle would be from the camera to the target aircraft. Similarly, the cell may be mounted on the wing surface by replacing the wing inspection plate 25 with a bubble-shaped Plexiglas cover positioned over the hood 17. In any position, the mounting must be chosen so that the reflected light is not greatly abstructed from striking the cell 22, and so that the position of the reflecting surface of the metal insert or camera aircraft is approximately the same with respect to the sun or source of illumination as the greater surface area of the target aircraft. The lead wires 18 and 19 of the photoelectric cell 1 may then be electrically connected to any of the conventional automatic servo systems for regulation of the exposure opening in an aircraft gun camera, such as the system described in the aforementioned patent application. In turn, the servo system is electrically connected to the exposure control system of a conventional aircraft gun camera. Proper calibration of the follow-up servo system may then be made so that the photocell 22 will cause variation of the exposure aperture of the aircraft gun camera in accordance with the reflected light from the aircraft.

In the mounted position, it is also to be noted that the Plexiglas cover 2 will serve as a protection from damage to the cell, will prevent accidental displacement of the mounting position of the cell, will prevent damage to the reflective insert and base plate surface due to scratches, dirt, or other foreign material, and being constructed of a transparent material will not interfere with the operation concerned.

In operation, the aluminum insert 8 will have a light reflection surface which will simulate the surface area of the target aircraft as a reflected surface for the sun's rays to the photocell device. The most effective position of the camera aircraft for air-to-air photography is obtained when the axis of flight of the camera and target aircraft are in the same plane, since the insert light reflecting surface will then present the same angle of reflection relative to the sun's rays as the target aircraft.

Figs. 3, 4, 5, and 6 illustrate a former method of tracking a target plane without the utilization of a simulated reflecting surface. The light level is registered by the photocell in these examples by the former method of direct reflection from the target plane and its immediate surroundings. In Fig. 3, it is desired to obtain the correct exposure aperture for the bright aluminum surface of the target aircraft alone; however, since the target aircraft is comparatively small the main influence on the photocell 22 will be the sun's reflection off the ground 30, which is dark, thus resulting in severe overexposure in filming the subject.

In Fig. 4, defective exposure results from including the bright sky, since the sun is in front of the target plane, and the light level of the target plane will then be low compared with that of the sky and the result would be an under exposure of the target plane.

Fig. 5 is another instance of defective exposure encountered where the photocell is actually reading the sun reflection off the top of a cloud layer 31, although the target plane is not reflecting sunlight toward the camera, resulting in under exposure of the target aircraft. It is to be noted that each of the above tracking positions of Figs. 3, 4 and 5, the defective exposure is easily remedied by use of the simulated reflecting surface 8 or camera aircraft surface viewed by the photocell 22. The photocell, instead of facing forwardly and relating the reflection from the overall scene, would then be rotated to an angular downward position, as shown in Fig. 1, to read directly on the reflective surface of the insert plate and, therefore, would eliminate the detracting influence of the atmosphere background brightness or ground "darkness" relative to the target. In this way, the viewing relation of the downwardly facing cell to the reflective surface of camera aircraft and the source of illumination for the target aircraft will be similar to the viewing angle of the cell toward the target aircraft relative to the source of illumination.

An additional problem is illustrated in Fig. 6 where the camera aircraft is tracking the target plane directly into the sun. Here the sun is not blocked out by the target plane and its rays will stream directly past the target aircraft, thus silhouetting the target aircraft and causing the light reflection or light level of the target to be comparatively low in relation to the intense light value of the sun in the background. In this exceptional case, it is essentially in order to obtain the best exposure under the circumstances that the photocell reading be taken partially from the incident light rays streaming past the target aircraft. It has been found that, notwithstanding the low light reflection off both the target plane and simulated surface 8, it is preferable in this instance to gauge the exposure reading from the incident sun rays, since otherwise a washing out of the target aircraft image would result due to overexposure. The sensing unit in the present invention will nevertheless take a direct reading without adjustment, since the photocell, although in an angular downward-facing position, will be responsive to the incident beams passing directly over the reflective surface 8 into the photocell 22 only when in the tracking position illustrated in Fig. 6 of the drawings.

In air-to-ground photography operations the photocell, rather than indicate the reflected light of the reflective surface 8 will, of course, operate more efficiently and accurately by a direct reading of the ground. The photocell will be rotated upward to a directly outward-facing position, so that the photocell will read directly from the light reflected from the ground when the camera aircraft is diving, rotation of the photocell being accomplished as described earlier in the description.

Of course, the effectiveness of the reflective surface 8 will decrease whenever the rays strike the surface at an angle in variation with the selective angle of the top or outer surface of the target aircraft. At the same time, particularly in flights for photography work only, the pilot may easily maintain the most desirable relative angle between the target and camera aircraft for the photographic exposure.

It is to be understood that the above description and illustrations in the drawings are for the purpose of illustration rather than restriction and that other various modifications and changes in the construction are contemplated which come within the scope of my invention as defined in the appended claims.

I claim:

1. In a photographic light value determining means for an aircraft gun camera installation, apparatus for reflecting an amount of light proportional to that reflected by a subject to be photographed, said apparatus comprising a non-reflective base support provided with an insert receiving opening therein; a replaceable reflective surface plate inserted into said opening adaptable to simulate the greater light reflection surface of said subject for the reflection of light rays onto said photocell; and rotatable light-responsive means fixed to said support adaptable to be rotated downwardly to receive the light reflected by said reflective surface to the substantial exclusion of the light reflected by the scene to be photographed in air-to-air photography and to be rotated upwardly to receive primarily incident light in air-to-ground photography.

2. A photoelectric sensing device for indicating the correct brightness level of an object to be photographed comprising light reflection means adaptable to simulate the light intensity of the object to be photographed to the substantial exclusion of incident light from the background thereof, and a rotatably mounted photocell adapted to be rotated between a downward position facing said light reflection means and primarily admitting reflected light therefrom and an upward position primarily admitting incident light from said backgruond.

3. A photoelectric sensing device for indicating the correct brightness level of an object to be photographed in air-to-air photography by substantially eliminating the effect of background light comprising a transparent cover element open at the bottom thereof, a pair of base plates affixed together as a unit to the bottom of said cover element and having an opaque upper surface, each of said base plates being coincidentally slotted to form an elongated opening incorporating plate-receiving grooves, a reflective insert plate positioned in said opening in slidable engagement within said grooves and adaptable to simulate the reflectivity of the object to be photographed, a pair of upright parallel supports mounted on the upper surface of said base plates rearwardly of said opening each having a longitudinally extending slot, adjustable supporting means slidably positioned in said longitudinally extending slots, a hood positioned in threaded engagement with said adjustable supporting means between said upright supports, and a photoelectric cell mounted in said hood rearwardly of, and overlooking said reflective insert plate and facing downwardly towards said plate to receive primarily reflected light rays from said plate to the substantial exclusion of incident background light.

4. A photoelectric sensing device as in claim 3, said hood and the photocell mounted therein being rotatable to an upward, forward-facing position to receive directly background light reflected from the ground in air-to-ground photography.

References Cited in the file of this patent

UNITED STATES PATENTS 2,739,246   Hunter _____ Mar. 20, 1956

FOREIGN PATENTS 472,147   Great Britain _____ Sept. 17, 1937
847,248   Germany _____ Aug. 21, 1952